(12) United States Patent
McDonald et al.

(10) Patent No.: US 11,565,330 B2
(45) Date of Patent: Jan. 31, 2023

(54) MACHINE CHUCK JAWS AND METHOD OF MANUFACTURE

(71) Applicant: Alpha Precision Group, Inc., St. Marys, PA (US)

(72) Inventors: Phillip McDonald, St. Marys, PA (US); Seth Weible, St. Marys, PA (US); Joseph Taylor, St. Marys, PA (US); Dean Bowley, St. Marys, PA (US); Benjamin Jovenitti, St. Marys, PA (US)

(73) Assignee: Alpha Precision Group, Inc., St. Mary's, PA (US)

( * ) Notice: Subject to any disclaimer, the term of this patent is extended or adjusted under 35 U.S.C. 154(b) by 82 days.

(21) Appl. No.: 17/034,068

(22) Filed: Sep. 28, 2020

(65) Prior Publication Data
US 2022/0097148 A1 Mar. 31, 2022

(51) Int. Cl.
*B23B 31/16* (2006.01)

(52) U.S. Cl.
CPC ... *B23B 31/16275* (2013.01); *Y10T 279/1986* (2015.01)

(58) Field of Classification Search
CPC ............ B23B 31/102; B23B 31/16012; B23B 31/16054; B23B 31/16091; B23B 31/16129; B23B 31/16166; B23B 31/16204; B23B 31/16241; B23B 31/1627; B23B 31/16275; Y10T 279/1986
See application file for complete search history.

(56) References Cited

U.S. PATENT DOCUMENTS

| 1,799,019 | A | * | 3/1931 | Mischler | ............... C03B 23/045 279/151 |
| 2,464,507 | A | * | 3/1949 | Hohwart | ................. B23B 31/32 279/123 |
| 3,190,664 | A | * | 6/1965 | Toth | ...................... B23B 31/025 33/573 |
| 3,744,809 | A | * | 7/1973 | Bennett | ................. B23B 31/207 279/123 |

(Continued)

FOREIGN PATENT DOCUMENTS

| CH | 655262 A5 | * | 4/1986 |
| CN | 108723411 A | * | 11/2018 |

(Continued)

*Primary Examiner* — Eric A. Gates
(74) *Attorney, Agent, or Firm* — Warner Norcross + Judd LLP (57) ABSTRACT

Machine chuck jaws, and a related method of manufacture, are provided. The machine chuck jaws are formed from an additive manufacturing process and include one or more gripping pads per chuck jaw. An axial stop is also formed from an additive manufacturing process and provides a flat surface for workpiece placement. The gripping pads equally distribute the clamping pressure, and the additive manufacturing process provides unique shaping capabilities and a honeycomb internal cross-section, thereby achieving a lightweight design. The reduction in weight allows for a decrease in pneumatic pressure used to actuate the jaws, resulting in a corresponding reduction in the clamping pressure which helps improve the form of the workpiece being machined.

13 Claims, 6 Drawing Sheets

(56) References Cited

U.S. PATENT DOCUMENTS

| | | | | |
|---|---|---|---|---|
| 4,221,391 A * | 9/1980 | Dutton | ............. | B23B 31/16275 |
| | | | | 269/271 |
| 4,431,202 A * | 2/1984 | Swenson | ............... | B23B 31/102 |
| | | | | 279/123 |
| 4,960,285 A * | 10/1990 | Doi | ................... | B23B 31/16275 |
| | | | | 279/123 |
| 5,735,534 A * | 4/1998 | Edwards | ........... | B23B 31/16279 |
| | | | | 279/123 |
| 6,145,850 A * | 11/2000 | Rehm | ............... | B23B 31/16279 |
| | | | | 279/124 |
| 6,568,694 B1 * | 5/2003 | White | ............... | B23B 31/16275 |
| | | | | 269/224 |
| 10,792,736 B1 * | 10/2020 | Velamakuri | ............ | B33Y 70/10 |

FOREIGN PATENT DOCUMENTS

| | | | |
|---|---|---|---|
| DE | 2435468 A1 * | 5/1976 | |
| DE | 2524327 A1 * | 12/1976 | |
| GB | 151460 A * | 9/1920 | |

\* cited by examiner

MACHINE CHUCK JAWS AND METHOD OF MANUFACTURE

FIELD OF THE INVENTION

The present invention relates to machine chucks jaws for the clamping of workpieces and tools, as well as their method of manufacture.

BACKGROUND OF THE INVENTION

Chucks jaws are used across many industries for clamping workpieces and tools in turning or milling operations. For example, a machine chuck can include three chuck jaws, each spanning 120 degrees. The chuck jaws move radially inward to hold the workpiece in place and are typically pneumatically or hydraulically driven. The chuck jaws provide clamping pressure to secure a part during material removal as well as counteract centrifugal forces while rotating at high spindle speeds, which would otherwise tend to force the chuck jaws outward.

Existing chuck jaws include full-contact jaws, where the clamping surface is uninterrupted, and partial-contact jaws, where the clamping surface includes separate pads. For example, a six-pad construction can include three jaws with two pads each. Chuck jaws are typically machined from standard wrought blanks, and in some applications, full-contact jaws are modified to mimic partial-contact jaws with the removal of material by milling operations.

Despite their widespread acceptance, there remains a continued need for improved chuck jaw designs/processes. In particular, design and process improvements are needed to provide an even distribution of chuck clamping pressure and a related method of manufacture.

SUMMARY OF THE INVENTION

Machine chuck jaws, and a related method of manufacture, are provided. The machine chuck jaws are formed from an additive manufacturing process and include one or more gripping pads per chuck jaw. An axial stop can also be formed from an additive manufacturing process and provides a flat surface for workpiece placement. In some cases, an axial stop can be designed into the jaws depending on the workpiece design, application, and space availability. The gripping pads equally distribute the clamping pressure, and the additive manufacturing process provides unique shaping capabilities based on an internal honeycomb cross-section, thereby achieving a lightweight design. The reduction in weight from the jaws reduces the amount of centrifugal force applied to the chuck during rotation, which in turn allows for a decrease in pneumatic pressure used to actuate the jaws, resulting in a corresponding reduction in the clamping pressure.

In one embodiment, the machine chuck jaws assembly includes a plurality of chuck jaws and an axial stop (if applicable). The plurality of chuck jaws are disposed about a rotational axis and include a curved clamping face and a wedge-shaped mounting arm. The curved clamping face includes a first curved portion that is angularly offset from a second curved portion, such that a central gap exists therebetween. The wedge-shaped mounting arm extends beneath and radially outward from the curved clamping face and includes a plurality of socket openings for attachment to a rotating chuck. The axial stop is at least partially beneath the plurality of chuck jaws and includes a plurality of axial posts for limiting axial movement of a workpiece.

In another embodiment, the curved clamping face includes a first pad and a second pad for engaging a workpiece. The wedge-shaped mounting arm includes first and second spars extending radially outward from the curved clamping face, such that a lateral slot extends completely through the mounting arm from one side thereof to another side thereof. The mounting arm includes a base portion having first and second longitudinally extending flat side walls which diverge away from each other as a dovetail portion received within a rotating chuck.

In another embodiment, a method of manufacture is provided. The method includes forming at least one additive structure, the at least one additive structure comprising a chuck jaw having an open-cell infill region. The open-cell infill region includes a plurality of open cells, optionally being hexagonal cells, that are oriented radially outward from a curved clamping face. The chuck jaw is formed in successive layers according to a computer model, optionally according to a direct energy deposition process, fused deposition modeling process, bound metal deposition, powder bed fusion process, or another additive manufacturing process. The at least one additive structure can additionally include an axial stop having an open-cell infill region with a plurality of open cells that are oriented axially therein.

These and other features and advantages of the present disclosure will become apparent from the following description of the specific embodiments, when viewed in accordance with the accompanying drawings and appended claims.

DETAILED DESCRIPTION OF THE CURRENT EMBODIMENT

Figure 1:
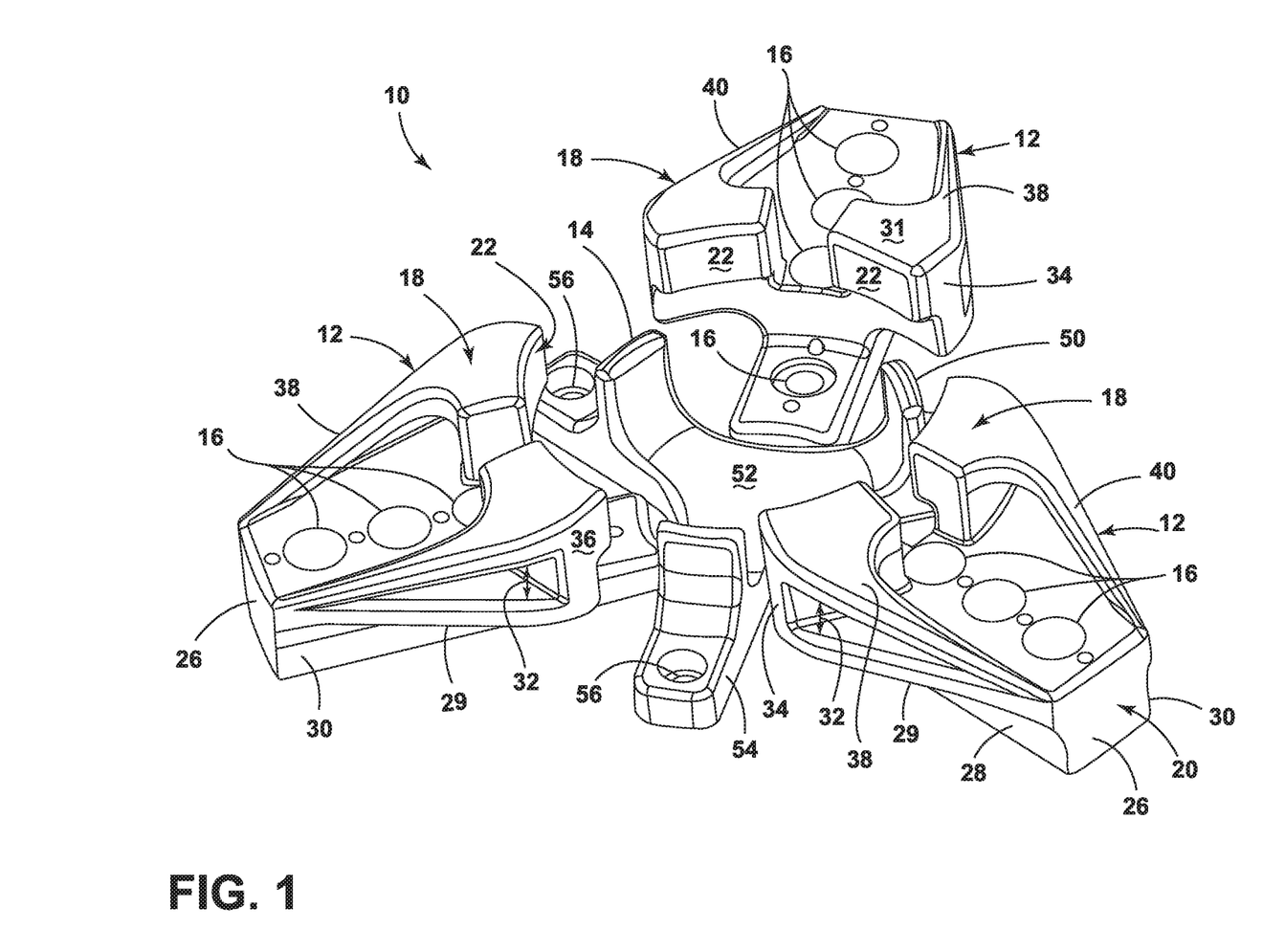
FIG. 1 is a perspective view of chuck jaws and an axial stop in accordance with an embodiment of the present invention.
Figure 2:
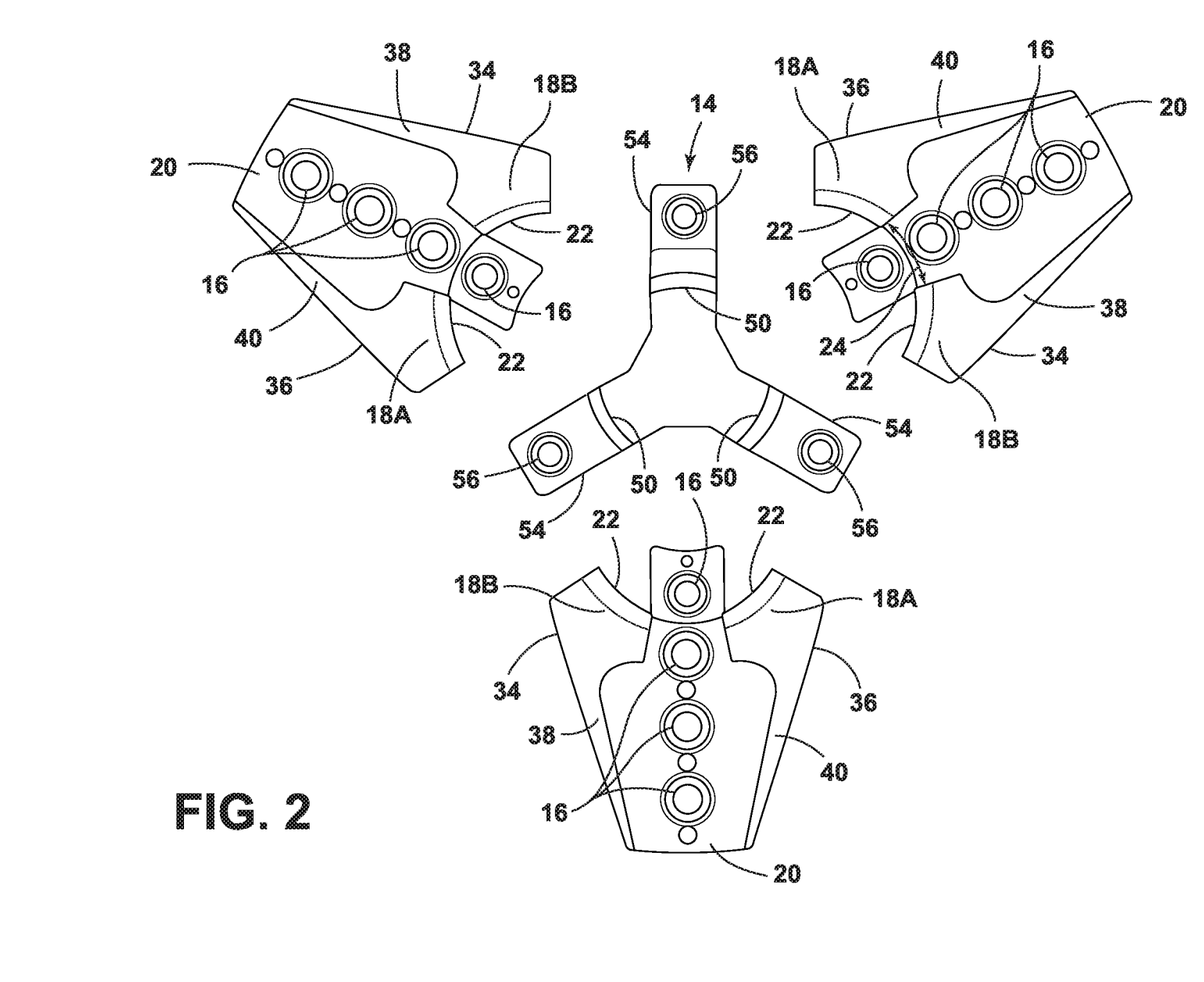
FIG. 2 is a plan view of the chuck jaws an axial stop in accordance with the embodiment of FIG. 1.
Figure 3:
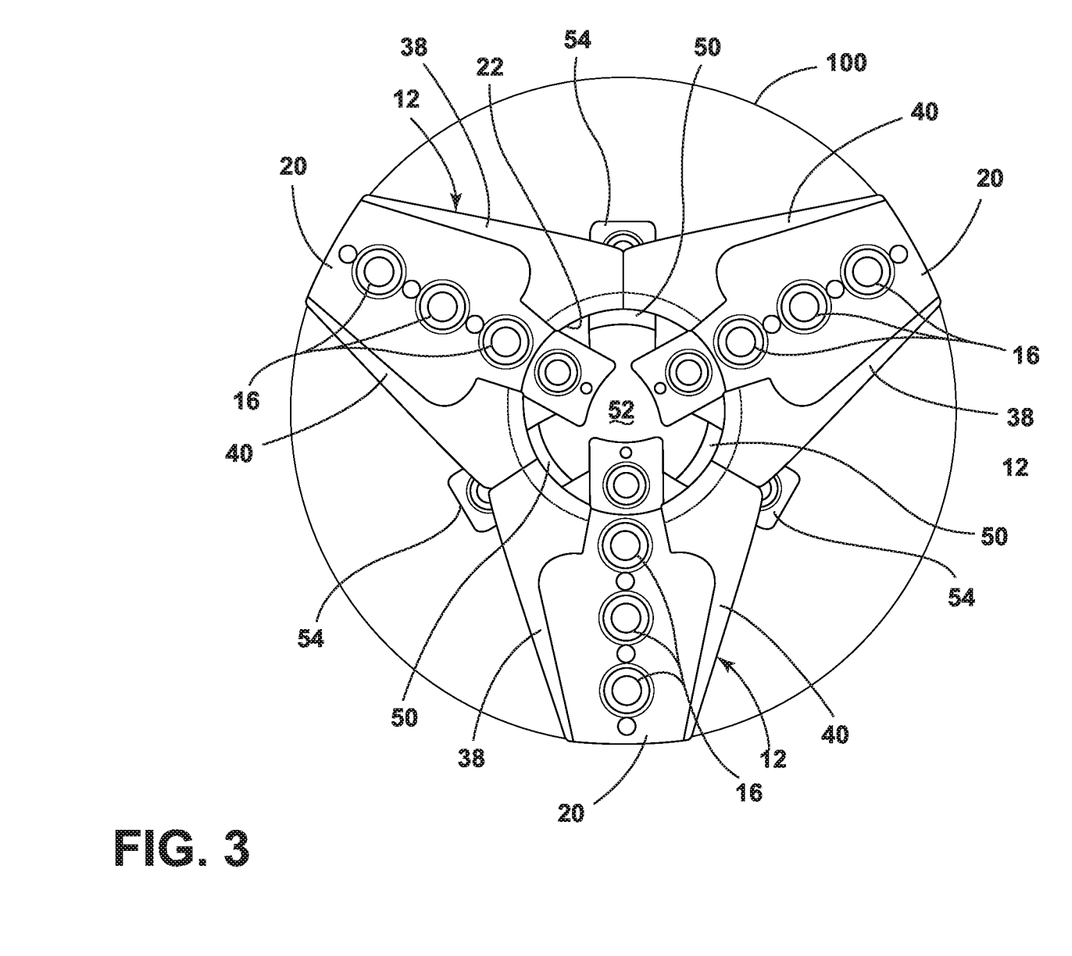
FIG. 3 is a plan view of the chuck jaws and axial stop of FIG. 1 mounted to a rotating chuck.

Referring to FIGS. 1-3, one embodiment of a chuck jaw assembly is shown and generally designated 10. The chuck jaw assembly 10 includes a plurality of jaws 12 and an axial stop 14 that are removably secured to a rotating chuck 100. The plurality of chuck jaws 12 radially slide along the rotating chuck and are removably secured to the rotating chuck 100 with bolts that extend through countersunk sockets 16 the plurality of chuck jaws 12. The plurality of chuck jaws 12 and the axial stop 14 are separately discussed below.

In the current embodiment, the plurality of chuck jaws 12 includes three chuck jaws, each having a curved clamping portion 18 and a wedge-shaped mounting arm 20. Other embodiments can include a different number of chuck jaws, for example four chuck jaws. The clamping portion 18 includes is subdivided into a first portion 18A and a second portion 18B, with the first portion 18A being angularly offset from the second portion 18B such that a central gap 24 exists therebetween. The clamping portion 18 further includes two pads 22. The pads 22 are separated by the central gap 24 and provide a contact surface to hold a workpiece. The pads 22 are optionally replaceable or removably secured to the clamping portion 18. The mounting arm 20 extends radially outward from the clamping portion 18 and includes the above-noted countersunk sockets 16 for attachment to the cylinder body 100. The bolts (not shown) thread into threaded openings in the rotating chuck 100 that align with the countersunk sockets 16.

As noted above, the mounting arm 20 is wedge shaped, in that it includes an inclined top surface 31 which gradually decreases in height when viewed from the side. The mounting arm 20 includes a rectangular base portion 26 and a flat, optionally trapezoidal, plate 29. The base portion 26 optionally includes a dovetail shape that is formed with a pair of longitudinally extending flat side walls 28, 30 which diverge away from each other. The mounting arm 20 has a lateral slot 32 that extends completely through the jaw 12, from a first side surface 34 to a second side surface 36. Consequently, each jaw 12 includes first and second sloped spars 38, 40 that interconnect a top portion of the clamping portion 18 and a distal portion of the mounting arm 20. The spars 38, 40 are spaced apart from each other and converge toward each other where they join the mounting arm 30 distal from the clamping portion 18.

As also shown in FIGS. 1-3, the axial stop 14 is threadably joined to the rotating chuck 100 and is partially beneath the chuck jaws 12. In particular, the axial stop 14 includes three axial posts 50 that extend upward from a triangular base plate 52. The axial stop 14 including three legs 54 that are spaced 120 degrees from each other and extend radially outward from the base plate 52. Each leg 54 includes a countersunk socket 56 aligned with a threaded opening in the cylindrical body 100. As shown in FIG. 3, the outer diameter of the axial posts 50 is less than the inner diameter of the chuck jaws 12 in the inward-most position. In addition, the axial posts 50 are aligned with the break between adjacent chuck jaws 12.

As noted above, the chuck jaws 12 and the axial stop 14 are additive structures. These additive structures are formed according to any process in which a three-dimensional build is formed in successive layers. Suitable additive manufacturing techniques include, by non-limiting example, direct energy deposition, laser powder bed fusion, fused deposition modeling processes, bound metal deposition processes, and lithography processes. Direct energy deposition, for example, involves the simultaneous introduction of the additive material and the energy source. The additive material, optionally 17-4PH stainless steel, is fed in the form of a powder or as a filament, and upon interaction with the energy source, the additive material melts almost instantly, creating a melt pool that solidifies rapidly as the energy source moves away. This process repeats itself until the additive structure is completed. In laser powder bed fusion, as a further example, a laser beam scans select locations of a powder bed to fuse a metal powder feedstock to the solid material underneath either by full melting (selective laser melting) or partial melting (selective laser sintering). The powder bed is then lowered and a new layer of powder feedstock is dropped and leveled. This process repeats itself until the additive structure is completely built, during which time the build chamber is protected by a flow of inert gas, for example argon or nitrogen, to prevent oxidation.

Figure 6:
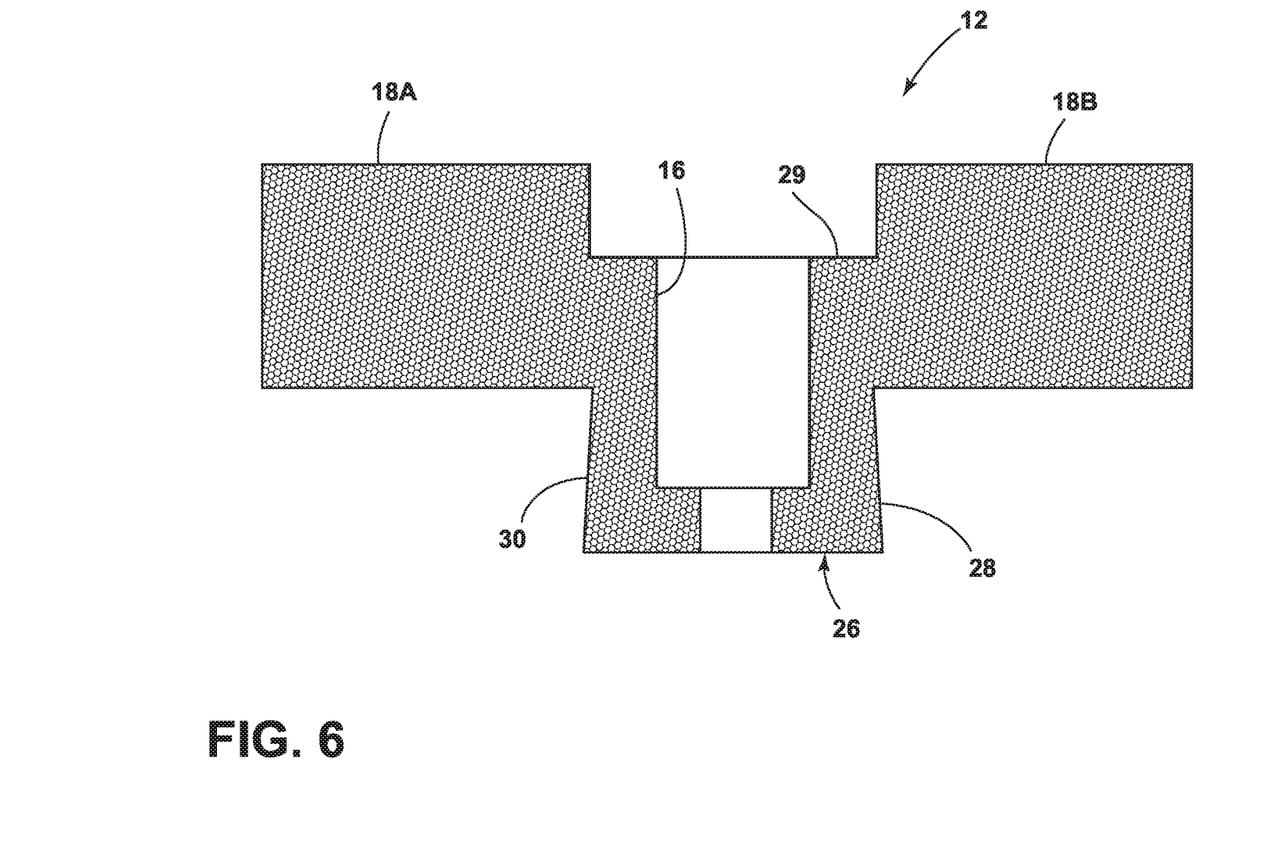
FIG. 6 is a cross-section of the chuck jaws of FIG. 1 illustrating an open cell in-fill region.

These and other additive manufacturing processes are used to form the chuck jaws 12 and the axial stop 14, which can comprise overhangs, undercuts, and internal volumes. For example, the interior of the chuck jaws 12 can include a honeycomb infill (or other open-cell infill pattern, including rectangular cells, pentagonal cells, octagonal cells, or combinations thereof) oriented in the radial direction, such that each hexagonal hole extends in the radial direction, i.e., away from the curved clamping face. The chuck jaws can also be an organic shape that is modeled using generative design techniques. This may allow the chuck jaw to be essentially solid while still being extremely lightweight to that of a traditional chuck jaw design. This style chuck jaw would also be manufactured using an additive manufacturing method. Similarly, the interior of the axial stop 14 can include a honeycomb infill oriented in the axial direction. The honeycomb infill reduces the weight of each component and while preserving the ability of the chuck jaws 12 to withstand compressive loads in the radial direction and preserving the ability of the axial stop 14 to withstand compressive loads in the axial direction.

Figure 4:
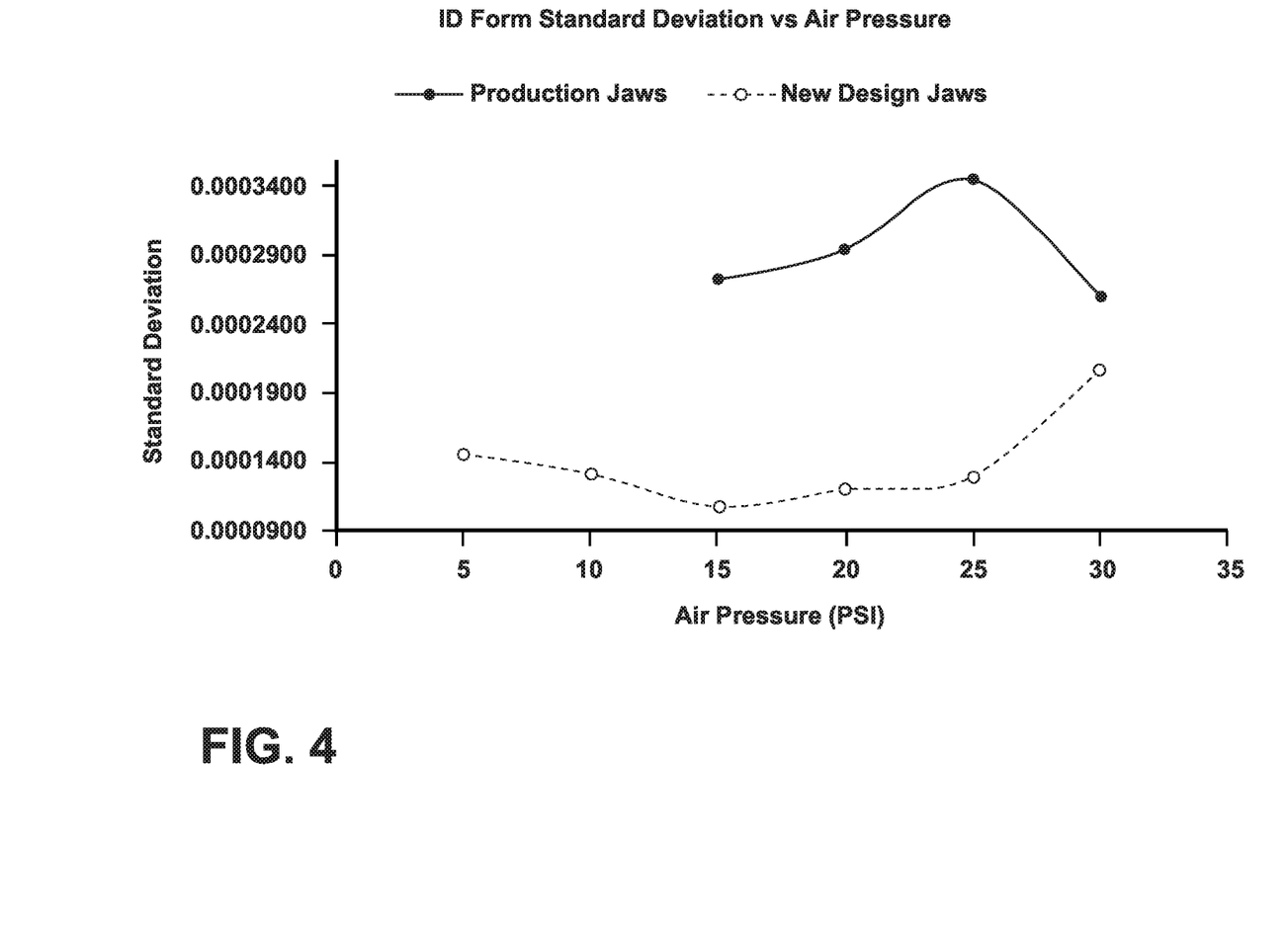
FIG. 4 is a graph illustrating the inner diameter form standard deviation as a function of air pressure.
Figure 5:
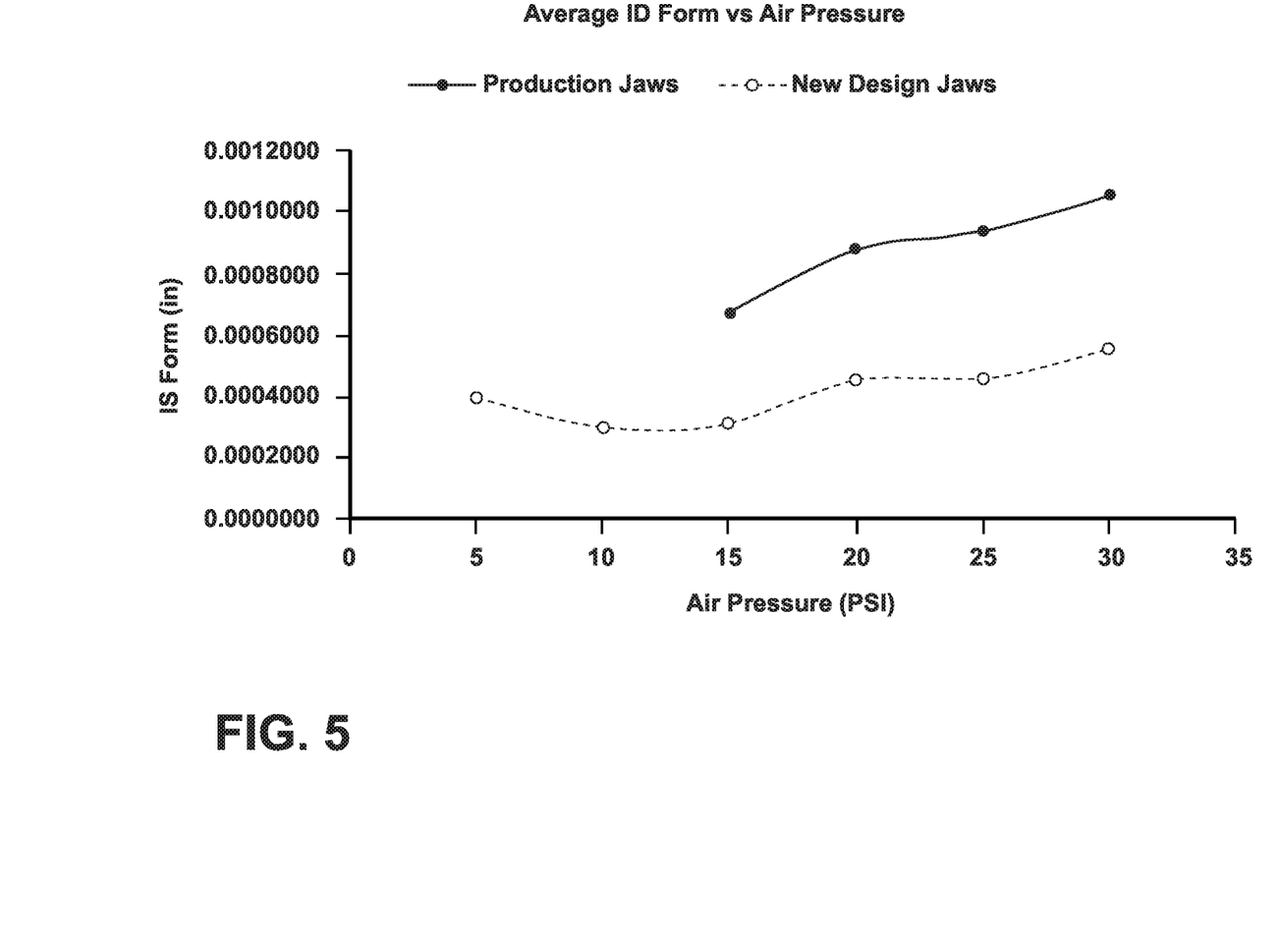
FIG. 5 is a graph illustrating the average inner diameter form as a function of air pressure.

The axial stop 14 is mounted to the rotating chuck 100 and the chuck jaws 12 are then mounted to the rotating chuck 100 for radial inward and outward movement. The rotating chuck 100 is typically mounted to a machine tool such as a lathe, and by means of a hydraulic or pneumatic system, jaw mounting members (joined to the chuck jaws 12) are caused to move radially inward or outward to cause the chuck jaws 12 to engage a workpiece with a desired clamping pressure. The reduction in weight allows for a decrease in air pressure used to actuate the jaws, resulting in a corresponding reduction in the clamping force of approximately 50% compared to jaws currently in use. As shown in FIG. 4, for example, the new design jaws were driven by pneumatic pressure of 5 to 30 PSI, compared to 15 to 30 PSI for existing production jaws. As also shown in FIG. 5, the average internal diameter form was less than the internal diameter form for existing production jaws, which required an increased air pressure, and in particular at least 15 PSI as compared to 5 PSI for the current invention. This reduction in clamping pressure results in less deformation in the workpiece being machined, especially in a thin-walled, fragile, or easily malleable workpiece. This allows for better manufacturing capability when considering form error, out of round variation, and position tolerance.

The above description is that of current embodiments. Various alterations can be made without departing from the spirit and broader aspects of the invention as defined in the claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A chuck jaw comprising:
   a curved clamping portion including a first curved portion that is angularly offset from a second curved portion such that a gap exists therebetween; and
   a wedge-shaped mounting arm for securing the chuck jaw to a rotating chuck, the mounting arm including a plurality of countersunk socket openings;
   wherein the mounting arm further includes first and second sloped spars interconnecting the curved clamping portion and an end portion of the mounting arm, such that a lateral slot extends completely through the mounting arm from one side thereof to another side thereof, wherein the mounting arm includes a generally rectangular base portion and a generally trapezoidal plate, wherein the generally rectangular base portion includes first and second longitudinally extending flat side walls which diverge away from each other, wherein a portion of the generally rectangular base extends radially inward beyond the curved clamping portion and includes a further countersunk opening.

2. The chuck jaw of claim 1 wherein the curved clamping portion and the wedge-shaped mounting arm are integrally joined to each other.

3. The chuck jaw of claim 1 wherein the curved clamping portion spans approximately 120-degrees about an axis of rotation.

4. The chuck jaw of claim 1 wherein the curved clamping portion includes first and second pads that are spaced apart from each other for engaging a workpiece.

5. A chuck jaw comprising:
a curved clamping portion including a first curved portion that is angularly offset from a second curved portion such that a gap exists therebetween; and
a wedge-shaped mounting arm for securing the chuck jaw to a rotating chuck, the mounting arm including a plurality of countersunk socket openings;
wherein the mounting arm further includes first and second sloped spars interconnecting the curved clamping portion and an end portion of the mounting arm, such that a lateral slot extends completely through the mounting arm from one side thereof to another side thereof,
wherein the curved clamping portion and the mounting arm include an internal honeycomb lattice structure.

6. A chuck jaw assembly comprising:
a plurality of chuck jaws disposed about a rotational axis, each of the plurality of chuck jaws including:
a curved clamping portion including a first curved portion that is angularly offset from a second curved portion such that a gap exists therebetween, and
a wedge-shaped mounting arm extending radially outward from the curved clamping portion, the mounting arm including a plurality of socket openings; and
an axial stop at least partially beneath the plurality of chuck jaws, the axial stop including a plurality of axial posts that extend upward from a base plate for limiting axial movement of a workpiece that is held in place by the plurality of chuck jaws, wherein the plurality of chuck jaws and the axial stop each include an internal honeycomb lattice structure.

7. The chuck jaw assembly of claim 6 wherein the plurality of chuck jaws includes three chuck jaws each spanning approximately 120 degrees.

8. The chuck jaw assembly of claim 6 wherein the plurality of chuck jaws include N-number of chuck jaws each spanning 360/N degrees.

9. The chuck jaw assembly of claim 6 wherein the plurality of axial posts includes three axial posts that are angularly offset at 120 degree intervals.

10. The chuck jaw assembly of claim 6 wherein the plurality of axial posts includes N-number of axial posts that are angularly offset at 360/N degree intervals.

11. The chuck jaw assembly of claim 6 wherein the plurality of axial posts define an outer diameter less than an inner diameter of the curved clamping portion.

12. The chuck jaw assembly of claim 6 wherein the wedge-shaped mounting arm includes a rectangular base portion having first and second side walls that diverge away from each other.

13. The chuck jaw assembly of claim 6 wherein the curved clamping portion and the wedge-shaped mounting arm are integrally joined to each other.

* * * * *